United States Patent [19]

Matsui et al.

[11] 4,290,791

[45] Sep. 22, 1981

[54] GAS-LIQUID SEPARATOR

[75] Inventors: Kunio Matsui; Hiroaki Tsuchiya, both of Yokohama; Ryushi Suzuki, Tokyo; Takayoshi Omura, Matsudo, all of Japan

[73] Assignee: Ishikawajima-Harima Jukogyo Kabushiki Kaisha, Tokyo, Japan

[21] Appl. No.: 133,799

[22] Filed: Mar. 25, 1980

[30] Foreign Application Priority Data

Mar. 29, 1979 [JP] Japan .................................. 54/37295

[51] Int. Cl.³ .............................................. B01D 45/12
[52] U.S. Cl. ....................................... 55/399; 55/426; 55/457; 55/459 C
[58] Field of Search ................. 55/184, 204, 206, 399, 55/426, 457, 459 R, 459 C, 203; 209/144; 210/512.1, 512.3

[56] References Cited

U.S. PATENT DOCUMENTS

| | | | |
|---|---|---|---|
| 806,129 | 12/1905 | Ford | 55/457 |
| 2,010,456 | 8/1935 | Jones | 55/426 |
| 2,316,729 | 4/1943 | Tryon | 55/204 |
| 2,578,568 | 12/1951 | Mayer et al. | 55/206 |
| 2,754,970 | 7/1956 | Ross | 55/457 |
| 2,888,096 | 5/1959 | Evans | 55/459 R |
| 3,276,188 | 10/1966 | Carlson | 55/204 |
| 3,771,288 | 11/1973 | Wisman et al. | 55/204 |
| 3,988,132 | 10/1976 | Oranje | 55/399 |
| 4,120,673 | 10/1978 | Nieden | 55/399 |

*Primary Examiner*—David L. Lacey
*Attorney, Agent, or Firm*—B. B. Olive

[57] ABSTRACT

A gas-liquid separator wherein a helical passageway is defined between an outer cylinder and an inner cylinder in such a way that a working fluid with entrained bubbles may be forced to flow tangentially into the helical passage and swirl therethrough. The entrained bubbles are separated from the liquid through centrifugal force produced by the swirling or vortical flow through the helical passageway and trapped or collected inside the inner cylinder, from which they are discharged to the exterior.

6 Claims, 7 Drawing Figures

GAS-LIQUID SEPARATOR

BACKGROUND OF THE INVENTION

The present invention relates to a gas-liquid separator of the type for separating and eliminating bubbles in a working fluid in hydraulic systems or the like.

When the working fluid passes through valves, orifices or the like in a hydraulic system or the like, sudden pressure drops occur so that the air dissolved in the working fluid evolves as bubbles. When the working fluid is an oil having a high viscosity, it is difficult for bubbles to release through it so that the bubbles cause erosion and noise. Thus it is imperative to remove the bubbles from the hydraulic system.

So far the working fluid with entrained or dissolved air or bubbles is charged and left in a tank or the like so that bubbles rise to the surface and rupture into the vapor phase. Alternatively, the pressure in the tank is reduced through a vacuum pump so that the entrained and dissolved air may be removed. However, with these gas-liquid separators, it takes a long time to separate bubbles or entrained and dissolved air. In addition, the desired separation efficiency cannot be attained without the use of a considerably large tank.

In FIG. 1 is shown a prior art gas-liquid separator of the type wherein the vortex or swirling motion of the fluid is utilized for separating entrained and dissolved gases. When a rotor a is driven by a prime mover (not shown), bubbles entrained and/or evolved from the liquid which is charged through an inlet d are forced to flow toward the center through centrifugal force and trapped by bubble trapping or collecting means c so that the liquid free from bubbles may be discharged through outlets e. This system or gas-liquid separator is by far more efficient than the tank type gas-liquid separator of the type described above, but is disadvantageous in that mainly because of the provision of the rotor a the separator becomes large in size, complicated in construction and expensive to manufacture.

In view of the above, a primary object of the present invention is to provide a gas-liquid separator which can separate bubbles or gases entrained and dissolved in a fluid without the use of a vacuum pump, a prime mover for rotating a rotor or the like.

Another object of the present invention is to provide a gas-liquid separator which can separate bubbles as rapidly as they are evolved or produced, whereby the degradation of a liquid may be avoided, the service life of hydraulic devices or the like may be increased and the generation of annoying noise may be suppressed to a negligible degree.

The above and other objects, features and advantages of the present invention will become more apparent from the following description of some preferred embodiments thereof taken in conjunction with the accompanying drawings.

BRIEF EXPLANATION OF THE DRAWINGS

The same reference numerals are used to designate similar parts throughout the figures.

DETAILED DESCRIPTION OF THE PREFERRED EMBODIMENTS

Figure 1:
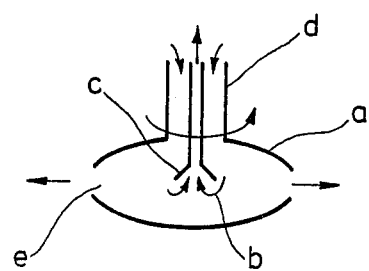
FIG. 1 is a schematic diagram of a prior art gas-liquid separator.
Figure 2:
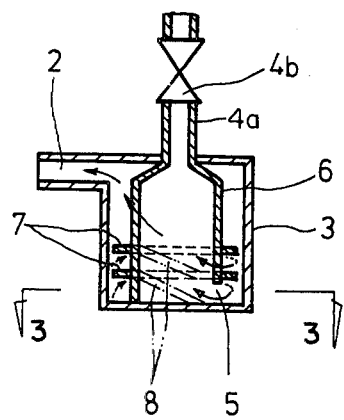
FIG. 2 is a longitudinal sectional view of a first embodiment of a gas-liquid separator in accordance with the present invention.
Figure 3:
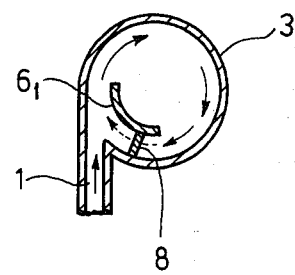
FIG. 3 is a cross sectional view taken along the line 3—3 of FIG. 2.

First Embodiment, FIGS. 2 and 3

Referring to FIGS. 2 and 3, a gas-liquid separator in accordance with the present invention has an outer cylinder 3 and an inner cylinder 6 disposed within the outer cylinder 3. The outer cylinder 3 is provided with an inlet 1 which is tangential to the peripheral side wall of the outer cylinder 3 and opens at the vicinity of the bottom thereof and an outlet 2 extended outwardly from the portion adjacent to the top of the outer cylinder 3. The inner cylinder 6 is provided at its discharge end with an air exit tube 4A which is extended upwardly through the top wall of the outer cylinder 3 and includes a valve 4b. The bottom of the inner cylinder 6 is opened and an extension $6_1$ of a predetermined length of arc (See FIG. 3) is extended downward by a predetermined length. Therefore when the inner cylinder 6 is disposed within the outer cylinder 3, the bottom edge of the inner cylinder 6 except the extension $6_1$ is spaced apart from the bottom of the outer cylinder 3 by a predetermined distance as best shown in FIG. 2, leaving a window means or an arcuate inlet 5 into the inner cylinder 6.

An annular upper guide plate 7 and an annular lower guide plate 7 are attached to the outside cylindrical wall of the inner cylinder 6 so as to define fluid passageways between the outer and inner cylinders 3 and 6. The lower guide plate 7 is attached to the inner cylinder 6 adjacent to the bottom edge thereof and the upper guide plate 7 is vertically upwardly spaced from the lower guide plate 7 by a suitable distance.

An inclined guide plate 8 is interposed between the bottom of the outer cylinder 3 and the lower guide plate 7 and another inclined guide plate 8 is also interposed between the lower and upper guide plates 7, whereby a helical passageway may be defined which extends from the inlet 1 toward the outlet 2 of the outer cylinder 3.

The mode of operation of the first embodiment with the above-described construction will be described as follows. The working liquid with bubbles or entrained and dissolved air or gases flows tangentially into the gas-liquid separator through the inlet 1 and then flows upward toward the outlet 2 through the helical passageway which is defined, as described above, between the outer and inner cylinders 3 and 6 by the guide plates 7 and 8. Because of the tangentially directed flow into the gas-liquid separator, the forced helical flow in it and a high velocity of the working fluid, the bubbles entrained in the working fluid and with low densities are forced to flow through centrifugal force toward the axis of the gas-liquid separator and the working fluid free from bubbles is forced to flow along the inside cylindrical wall of the outer cylinder 3. That is, as the charged working fluid makes an initial circulation in the circular passage defined between the outer and inner cylinders 3 and 6 and the guide plates 7 and 8, bubbles are forced to flow toward the axis of the gas-liquid separator through the arcuate inlet 5 into the inner cylinder 6. Within the inner cylinder 6, the entrapped bubbles rise and are discharged at the discharge end through the valve 4 to the exterior. The working liquid, which is now free from the bubbles, flows upward through the helical passageway defined between the outer and inner cylinders 6 and 3 and the guide plates 7 and 8. Since the helical passageway above the lower guide plate 7 is not communicated with the interior of the inner cylinder 6, the entrainment of the bubbles trapped within the inner cylinder 6 into the working fluid may be completely avoided. Thus the working liquid completely free from bubbles or entrained and dissolved air or gases flows out from the outlet 2.

The gas-liquid separator in accordance with the present invention, though it is very simple in construction, can separate bubbles from a working liquid in a very efficient manner.

Figure 4:
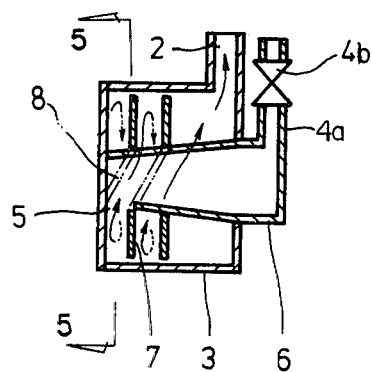
FIG. 4 is a longitudinal sectional view of a second embodiment of the present invention.
Figure 5:
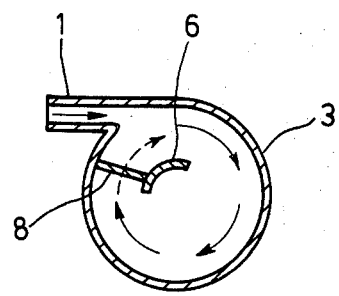
FIG. 5 is a cross sectional view taken along the line 5—5 of FIG. 4.

Second Embodiment, FIGS. 4 and 5

Whereas the first embodiment just described above with reference to FIGS. 2 and 3 may be referred to as "the horizontal type", the second embodiment shown in FIGS. 4 and 5 may be called "the vertical type". The second embodiment is substantially similar in construction to the first embodiment except that at least the upper portion of the cylindrical wall of the inner cylinder 6 is inclined at an angle to the horizontal so that the entrapped bubbles may smoothly flow therethrough toward the discharge end having valve 4.

It is apparent that the underlying principle of the second embodiment shown in FIGS. 4 and 5 is substantially same as the first embodiment shown in FIGS. 2 and 3. That is, the bubbles entrained in the working liquid charged into the gas-liquid separator are trapped in the inner cylinder 6 and rise smoothly therethrough toward the bubble space immediately below the valve 4. Thereafter, the entrapped bubbles are discharged at the discharge end through the valve to the exterior. The working liquid free from the bubbles is discharged through the outlet 2.

Figure 6:
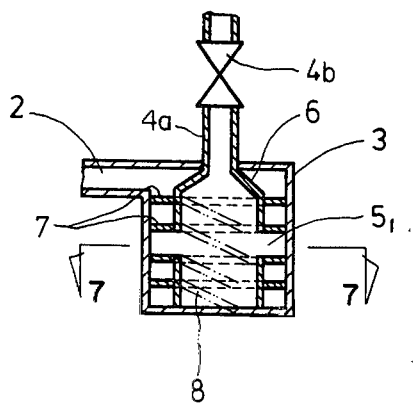
FIG. 6 is a longitudinal sectional view of a third embodiment of the present invention.
Figure 7:
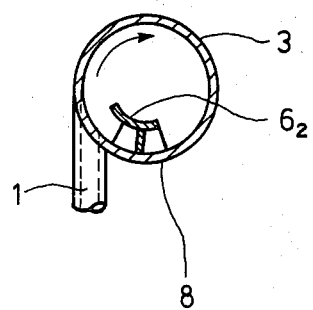
FIG. 7 is a cross sectional view taken along the line 7—7 of FIG. 6.

Third Embodiment, FIGS. 6 and 7

The third embodiment shown in FIGS. 6 and 7 is substantially similar in construction to the first embodiment shown in FIGS. 2 and 3 except some arrangements to be described below. Firstly, whereas the first embodiment has the helical fluid passageway consisting of only three turns, the third embodiment has a helical fluid passageway consisting of five turns as best shown in FIG. 6. The helical passageway is defined between the outer and inner cylinders 3 and 6 and the circular or annular guide plates 7 and the inclined guide plates 8 in a manner substantially similar to that described in conjunction with the first embodiment. Secondly the inner cylinder 6 has no arcuate extension $6_1$ projected downward from the bottom edge and instead the inner cylinder 6 is cut out intermediate between the ends thereof in such a way that an arcuate opening $5_1$ with a suitable subtended angle and a suitable height may be defined leaving a connecting portion $6_2$. In the third embodiment, the arcuate window or inlet $5_1$ into the inner cylinder 6 is shown as being defined along the third turn (from the bottom) of the helical fluid passageway, but it is to be understood that its position may be otherwise selected. Furthermore, the height of the arcuate opening or inlet $5_1$ may be equal to that of the turn of the helical passageway as shown in FIG. 6 or may be shorter.

In operation, as with the first embodiment, the tangentially introduced working fluid with entrained air or bubbles is forced to swirl gradually upwardly through the helical passageway in the gas-liquid separator. During this helical upward flow, the bubbles which are entrained in the working fluid and have by far lighter densities than the working fluid are trapped into the inner cylinder 6 through the arcuate opening or inlet $5_1$ for discharge through the discharge end and valve $4b$. Thus the positive gas-liquid separation can be accomplished.

So far the present invention has been described in detail with reference to some preferred embodiments thereof, but it is to be understood that various modifications and variations may be effected without leaving the true spirit of the present invention. Furthermore, it is apparent that the gas-liquid separators in accordance with the present invention may be equally applied other systems handling various fluids such as chemical processes than the hydraulic systems described above.

The features and advantages of the present invention may be summarized as follows:

(I) Without the use of vacuum pumps, rotary prime movers or the like, the positive gas-liquid separation may be accomplished at less cost and in an extremely simple manner.

(II) When the present invention is applied to a hydraulic system or the like utilizing bubble separating tanks or the like of large volume, it becomes possible to replace the large-volume bubble separating tanks or the like with small-volume ones. In addition, the flow rate of the working oil or the like may be considerably reduced.

(III) Noise, erosion and degradation of working fluid due to the formation of bubbles in the working fluids may be avoided so that the service life of hydraulic equipment or the like may be increased.

(IV) The gas-liquid separators in accordance with the present invention may be readily incorporated in the existing hydraulic systems or the like.

(V) The oil tank or the like which is mounted on for example a vehicle may be reduced considerably in volume or size, whereby the unladen weight may be reduced and the vehicle itself can be made more compact in size.

What is claimed is:

1. A gas-liquid separator comprising:
(a) an outer cylinder having a peripheral sidewall and first and second end walls;
(b) a gas collecting inner cylinder having a gas discharge end and disposed within said outer cylinder, said inner and outer cylinders defining an annular space therebetween, said inner cylinder being formed with an arcuate opening in a sidewall portion thereof for communicating said annular space with the interior of said inner cylinder at a selected location between said outer cylinder end walls and being sized to receive gas separated from the introduced fluid by centrifugal separation;
(c) a fluid inlet provided proximate said first end wall of the outer cylinder, said fluid inlet being tangential to said peripheral sidewall of said outer cylinder for introducing fluid into said annular space and in conjunction with the said walls of said outer cylinder being adapted to impart an initial circular motion to the introduced fluid leaving said inlet;

(d) a fluid outlet provided proximate the second end wall of the outer cylinder;

(e) means for imparting a helical flow to the circulating fluid, the helical flow carrying the fluid in said annular space from proximate said fluid inlet to proximate said fluid outlet, said means including annular guide plates defining fluid passageways; and (f) means communicating with said discharge end of the inner cylinder for removing separated gas therefrom.

2. A gas-liquid separator as set forth in claim 1 wherein said outer and inner cylinders are mounted vertically, and said fluid inlet communicates with the bottom portion of said outer cylinder while said fluid outlet communicates with the upper portion thereof.

3. A gas-liquid separator as claimed in claim 1 wherein said arcuate opening is positioned at the bottom of the cylinders.

4. A gas-liquid separator as claimed in claim 1 wherein said arcuate opening is intermediate the ends of said cylinders.

5. A gas-liquid separator as set forth in claim 1 wherein said outer and inner cylinders are mounted horizontally, and at least the top portion of the cylindrical wall of said inner cylinder is inclined at an angle upwardly toward said discharge end thereof.

6. A gas-liquid separator as claimed in claim 1 wherein said means for imparting a helical flow includes inclined guide plates interposed between said annular guide plates.

* * * * *